UNITED STATES PATENT OFFICE.

ALFRED EWART HOLLEY AND HARRY WILLIAM WEBB, OF OLDBURY, ENGLAND, ASSIGNORS TO CHANCE & HUNT, LIMITED, OF OLDBURY, ENGLAND.

ACID-RESISTING CEMENT.

1,288,413.  Specification of Letters Patent.  Patented Dec. 17, 1918.

No Drawing.  Application filed March 26, 1918.  Serial No. 224,799.

*To all whom it may concern:*

Be it known that we, ALFRED EWART HOLLEY and HARRY WILLIAM WEBB, subjects of the King of Great Britain, residing at Chemical Works, Oldbury, England, have invented a new and useful Improved Acid-Resisting Cement, of which the following is a specification.

Ordinary acid resisting cements usually consist of mixtures of an aqueous solution of sodium silicate with acid resisting siliceous material.

According to this invention lead carbonate or basic lead carbonate is added to these well known cements to increase their rapidity of setting.

The proportion of the lead carbonate added may vary within wide limits according to the rate of setting desired.

For example, a cement consisting of a mixture of eight parts by weight of finely ground stoneware, seven parts by weight of sand and two parts of less finely ground blue brick moistened with three parts by weight of a 60° Twaddell sodium silicate solution cannot be used for ordinary building purposes as it sets too slowly; if, however, about 0.5 parts by weight of lead carbonate be mixed with the solids before adding the silicate solution it can be so used.

The cement should be used within an hour of making up and no water or steam should be allowed to come into contact with either the solid constituents forming the cement or with the cement itself, until it is thoroughly dry and it is therefore desirable to subject the finished work for several days to a temperature of 100° C. or for a shorter time to a higher temperature.

Cements made in accordance with this invention are unaffected by mineral acids or mixtures thereof over a wide range of temperature and by sulfur dioxid or tri-oxid, nitrous gases, chlorin or sulfureted hydrogen; they are therefore particularly suitable for the erection of chimneys to take the acid fumes, for reaction and absorbing towers, for acid storage tanks, and in fact for all cases where a good acid resisting cement is required, and can be applied under suitable conditions.

What we claim is:—

1. An improved acid resisting cement comprising a compound containing the metal lead and the carbonic acid radical, acid resisting siliceous material and a solution of a silicate.

2. An improved acid resisting cement comprising a compound containing the metal lead and the carbonic acid radical, acid resisting siliceous material and a solution of sodium silicate.

In testimony that we claim the foregoing as our invention we have signed our names this 28th day of February, 1918.

ALFRED EWART HOLLEY.
HARRY WILLIAM WEBB.

Copies of this patent may be obtained for five cents each, by addressing the "Commissioner of Patents, Washington, D. C."